(12) United States Patent
Ootani et al.

(10) Patent No.: US 9,784,304 B2
(45) Date of Patent: Oct. 10, 2017

(54) CONNECTING ROD FOR AN ENGINE AND METHOD OF MAKING THEREOF

(71) Applicant: Nissan Motor Co., Ltd., Kanagawa (JP)

(72) Inventors: Masayuki Ootani, Kanagawa (JP); Yukihiro Fujioka, Kanagawa (JP); Shinya Oohira, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 338 days.

(21) Appl. No.: 14/710,164

(22) Filed: May 12, 2015

(65) Prior Publication Data

US 2015/0240864 A1 Aug. 27, 2015

Related U.S. Application Data

(62) Division of application No. 13/354,582, filed on Jan. 20, 2012, now abandoned.

(30) Foreign Application Priority Data

Jan. 24, 2011 (JP) ................................. 2011-011550

(51) Int. Cl.
| | | |
|---|---|---|
| *B21D 53/84* | (2006.01) | |
| *B23P 17/00* | (2006.01) | |
| *B23P 11/00* | (2006.01) | |
| *F16C 7/02* | (2006.01) | |
| *F16C 9/04* | (2006.01) | |
| *B23P 15/00* | (2006.01) | |

(Continued)

(52) U.S. Cl.
CPC .............. *F16C 7/023* (2013.01); *B23P 15/00* (2013.01); *F16C 9/04* (2013.01); *B23P 2700/04* (2013.01); *F16C 2240/40* (2013.01); *Y10T 29/49288* (2015.01); *Y10T 74/2162* (2015.01)

(58) Field of Classification Search
CPC ........ F16C 7/023; F16C 9/04; F16C 2240/40; B23P 15/00; B23P 2700/04; Y10T 29/49288; Y10T 74/2162
USPC .............. 29/888.09, 525.01, 525.11, 402.09, 29/402.14
See application file for complete search history.

(56) References Cited

U.S. PATENT DOCUMENTS

| | | | | |
|---|---|---|---|---|
| 3,952,390 A | * | 4/1976 | Amos ..................... | B23K 11/04 29/898.053 |
| 5,878,323 A | * | 3/1999 | Sakai ..................... | B21K 1/766 29/888.092 |

(Continued)

*Primary Examiner* — Sarang Afzali
*Assistant Examiner* — Darrell C Ford
(74) *Attorney, Agent, or Firm* — Osha Liang LLP

(57) ABSTRACT

A method to modify the geometry of a connecting rod of an internal combustion engine includes providing a connecting rod having a crankshaft bore at a first end, wherein the first end has a bearing cap and a bottom end portion of the connecting rod, mating the bearing cap with the bottom end portion of the connecting rod to form the crankshaft bore of the connecting rod, machining a width upset portion of the bottom end portion to reduce a width of the bottom end portion of the connecting rod, machining a width upset portion of the bearing cap to reduce a portion of a width of the bearing cap, and reducing the width of the bottom end portion of the connecting rod and the portion of the width of the bearing cap to a width smaller than a cylinder bore of the internal combustion engine.

3 Claims, 2 Drawing Sheets

(51) Int. Cl.
    *B23P 19/04*    (2006.01)
    *B23P 6/00*     (2006.01)

(56) References Cited

U.S. PATENT DOCUMENTS

| | | | |
|---|---|---|---|
| 6,422,755 B1 * | 7/2002 | Cadle | B22F 5/00 29/888.092 |
| 6,490,790 B1 * | 12/2002 | Soga | B21K 1/766 29/557 |
| 2002/0148325 A1 * | 10/2002 | Bergsma | B22D 17/007 74/593 |
| 2004/0025626 A1 * | 2/2004 | Burns, Jr. | B23P 15/00 74/579 R |
| 2004/0074335 A1 * | 4/2004 | Whitney | F16C 7/023 74/579 R |
| 2005/0172484 A1 * | 8/2005 | Hase | B23D 31/003 29/888.09 |
| 2007/0125025 A1 * | 6/2007 | Knott | F16B 5/02 52/393 |
| 2008/0216599 A1 * | 9/2008 | Murakami | B21J 5/063 74/594 |
| 2009/0250859 A1 * | 10/2009 | Okumura | B23D 31/003 269/74 |
| 2009/0314246 A1 * | 12/2009 | Martino | B22F 5/003 123/197.3 |

* cited by examiner

CONNECTING ROD FOR AN ENGINE AND METHOD OF MAKING THEREOF

CROSS-REFERENCE TO RELATED APPLICATIONS

This application is a divisional application of U.S. patent application Ser. No. 13/354,582 filed Jan. 20, 2012, and claims priority from Japanese Patent Application No. 2011-11550 filed Jan. 24, 2011, the contents of which are hereby incorporated by reference in their entirety.

BACKGROUND OF THE DISCLOSURE

Field of the Disclosure

The present disclosure relates to a connecting rod for an internal combustion engine and a manufacturing method therefore.

Description of the Related Art

A connecting rod that connects a piston pin of an engine with a crankshaft having a small end portion connected to a piston via a piston pin and a large portion rotatably engaged with a crank pin of a crankshaft, in which both portions are connected through a rod portion, is known. The large portion is formed by a cap of half-cut shape forming a part of the large portion and a part of a main rod body. The main rod body comprises the remaining part of the half-cut shape, the small portion, and the rod portion. When assembling an engine, the small portion of the connecting rod is first connected to a piston by a piston pin, and subsequently, the large portion of the main rod body will be inserted from the upper side of a cylinder block into a cylinder bore, then the large portion of the main rod body and of the cap will be connected together by bolts with a crank pin of the crankshaft below the cylinder block interposed therebetween.

According to a conventional partitioning method between a main rod body and a cap, a so-called horizontal partitioning type has been used in which a mating surface (partitioning surface) of the large portions is placed along a reference horizontal plane perpendicular to a link center line passing through the center points of the small portion and that of the large portion. In addition, as disclosed in a Japanese Unexamined Patent Application No. 11-62944, a slant partition type is also known in which a mating surface of large portions (partition surface) is slanted or inclined with respect to a reference horizontal plane.

SUMMARY OF THE CLAIMED SUBJECT MATTER

According to one or more embodiments of the present disclosure, a method to modify the geometry of a connecting rod of an internal combustion engine comprises providing a connecting rod comprising a crankshaft bore at a first end, wherein the first end comprises a bearing cap and a bottom end portion of the connecting rod, mating the bearing cap with the bottom end portion of the connecting rod to form the crankshaft bore of the connecting rod, machining a width upset portion of the bottom end portion to reduce a width of the bottom end portion of the connecting rod, machining a width upset portion of the bearing cap to reduce a portion of a width of the bearing cap, and reducing the width of the bottom end portion of the connecting rod and the portion of the width of the bearing cap to a width smaller than a cylinder bore of the internal combustion engine.

According to one or more embodiments of the present disclosure, the method further comprises machining the remaining width upset portion of the bearing cap to a width smaller than a cylinder bore of the internal combustion engine.

According to one or more embodiments of the present disclosure, the method further comprises disassembling the bearing cap from the bottom end portion of the connecting rod, re-assembling the bearing cap to the bottom end portion of the connecting rod, and finishing machining the crankshaft bore of the re-assembled connecting rod.

According to one or more embodiments of the present disclosure, the method further comprises rough machining the crankshaft bore of the connecting rod while the bearing cap is mated to the bottom end portion of the connecting rod.

According to one or more embodiments of the present disclosure, the method further comprises bolting the bearing cap to the bottom end portion of the connecting rod.

According to one or more embodiments of the present disclosure, the method further comprises securing the bearing cap relative to the bottom end portion of the connecting rod with a manufacturing fixture.

According to one or more embodiments of the present disclosure, the width of the bottom end portion of the connecting rod and the portion of the width of the bearing cap are reduced to be equal widths.

According to one or more embodiments of the present disclosure, a connecting rod of an internal combustion engine comprises a small end portion to be connected to a piston of the engine, a large end portion to be connected to a crankshaft of the engine, and a rod portion extending between the small end portion and the large end portion in a longitudinal direction. The large end portion of the connecting rod comprises a bearing cap and a bottom end portion of the connecting rod, and upset portions extending in a width direction perpendicular to the longitudinal direction. Upset portions of the bottom end portion of the connecting rod are machined to a width less than a diameter of a cylinder bore of the engine. A portion of upset portions of the bearing cap are machined to a width less than the diameter of the cylinder bore of the engine.

According to one or more embodiments of the present disclosure, the upset portions of the bearing cap are machined to the same width as upset portions of the bottom end portion of the connecting rod.

According to one or more embodiments of the present disclosure, a width of the upset portions at an upper part of the bearing cap is smaller than a width of the upset portions at a lower part of the bearing cap.

DETAILED DESCRIPTION

Figure 1:
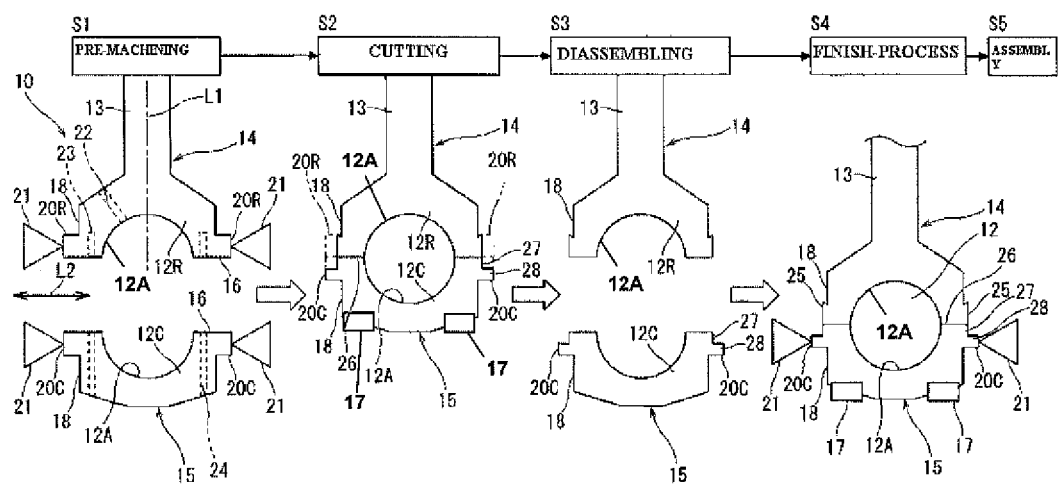
FIG. 1 is a schematic view showing a series of manufacturing steps or operations for a connecting rod of one or more embodiments of the present disclosure.

In an attempt to improve a fuel economy to cope with environmental issues, with respect to a part of engine series/models, the present applicant is considering employing a long stroke configuration in which a rate of a piston stroke to a bore diameter within a cylinder is set to be larger. By this long stroke configuration, a compact combustion chamber is obtained enabling a fast and continuous combustion of fuel, which may work for better fuel consumption with reduced vibration/noise due to a smaller pressure acting on a piston within a small cylinder bore.

However, a reduced diameter of cylinder bore accompanying this long stroke configuration may require a smaller large portion of a main rod body in a width direction, i.e., in a direction perpendicular to both a link center line connecting both centers of small and large portions and a longitudinal axis direction of a crank pin so that, when inserting a main rod body in a cylinder block, an interference of the large portion of main rod body with a cylinder bore may be avoided. Consequently, an existing manufacturing line for a normal stroke engine could not be used commonly for the long stroke engine because a reference position for holding and/or clamping by a clamping jig the opposite sides in the width direction of the large portion have to be different between a connecting rod with a long stroke engine and an existing connecting rod with a normal stroke engine, i.e., without an extended piston stroke. This could require new manufacturing installations or facilities and, because the manufacturing facilities for existing connecting rods may not be commonly used, higher cost and lower productivity may result.

Incidentally, for ease of insertion step during an engine assembly operation, if the width size of the large portion of main rod body would be set smaller than the size of the large portion on the part of a cap, a step may be created at opposite sides of the large portion of main rod body at a mating surface of the two large portions. Due to this step, a fretting wear may be experienced and/or a deformation of a large diameter bore serving as a bearing surface of the crank pin, a so-called "mouth distortion," may be encountered.

According to one or more embodiments of the present disclosure, by putting a pre-machining operation before a cutting operation in place, the same jig may be used for existing connecting rods with a large end portion, and, while maintaining both sides of large end portions of both the main rod body and cap prior to the cutting operation, a pre-processing may be performed such as a rough boring processing, a bolt hole processing and an oil hole processing. In addition, because both sides of the large end portion of main rod body have been removed or cut away, the main rod body can now be inserted without interfering with a cylinder bore in an assembly operation.

According to one or more embodiments of the present disclosure, in the cutting operation, while maintaining the main rod body and the bearing cap that are fastened by bolts, both the sides of the large end portion of the main rod body in a width direction and a part of the sides of the large end portion of the cap in the width direction are machined concurrently so that the width size of the large portions about the mating surface of the main rod body and cap may be the same. Thus, both sides in the width direction of the main rod body and of the cap produce a step-free, flush or flat surface contour. Therefore, advantageously, the progress of fretting wear may be suppressed and a deformation of a large diameter bore serving as a bearing bore of a crank pin may be held to a minimum.

One of the advantages of the connecting rod manufactured according to one or more embodiments of the present disclosure is that the opposite sides of the large end portion of the main rod body are cut away and the width size is reduced smaller than a cylinder bore diameter. In addition, both sides of the large end portion on the part of the bearing cap is cut out to have the same size of the width size of the large end of the main rod body only at the upper part of cap including a mating surface with the main rod body such that the width size of the sides of the cap is formed smaller at its upper part than at its lower part. In other words, at the lower part of the cap, the cap keeps an apron or upset portion protruding in both side directions in contrast to a cut-away portion at its upper part. Therefore, because of lack of apron or upset portion, the width of the large end portion of the main rod body can be set to have a smaller size than the width of the end portion of cap and insertion of the main rod body into a cylinder bore may be possible without a interference during the above described assembly step. In addition, because the cap maintains the upset portion protruding in both side directions, the same clamping jigs may be used commonly for the existing connecting rods with large end portion and a finish processing can be made to a bearing bore of the large end portion such as a boring processing of a large diameter bore.

For example, when manufacturing a connecting rod suitable for an engine with a longer stroke compared to a cylinder bore diameter than a conventional connecting rod, for ease of insertion of the main rod body into a cylinder bore during an assembly operation, the opposite sides in the width direction of the main rod body are cut out and made smaller in size in the width direction than the conventional connecting rod. On the other hand, in a pre-machining process performed in advance of this cutting operation, as with one or more embodiments of the present disclosure, by maintaining the same width as the existing connecting rods, the same jig can be used for holding both sides of the large end portions for production in the same manufacturing line. Therefore, additional manufacturing cost associated with an introduction of processing equipments may be suppressed and productivity may be improved.

Furthermore, according to one or more embodiments of the present disclosure, with respect to a connecting rod as a final product, at least a part of both sides of large end portions are cut away by a cutting operation so that a weight reduction and a smaller size may be achieved. In addition, in this cutting operation, a part of a cap including a mating surface is cut away together with the main rod body, which may produce a step-less, flush surface across the mating surface between the main rod body and cap. Advantageously, this configuration may serve to suppress the progress of fretting wear at the mating surface as well as a deformation of a large diameter bore for a crank pin journal.

Embodiments of the present disclosure with reference to the accompanying figures will be described herebelow, where the suffix R attached to reference numeral denotes part of a connecting main rod body 14, whereas the suffix C denotes a component of part of a cap 15.

Figure 2:
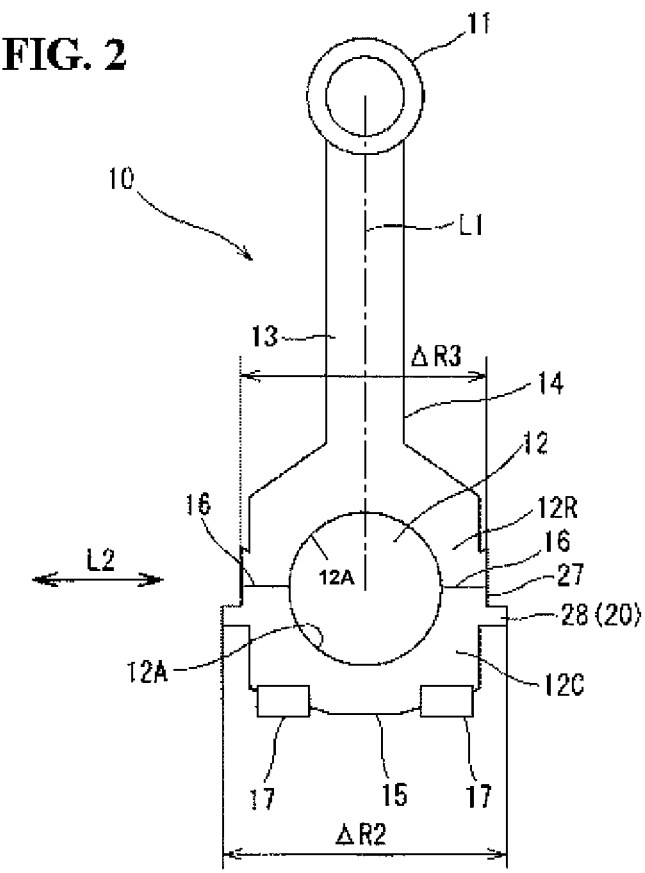
FIG. 2 is a side view of a connecting rod in accordance with one or more embodiments of the present disclosure.
Figure 3:
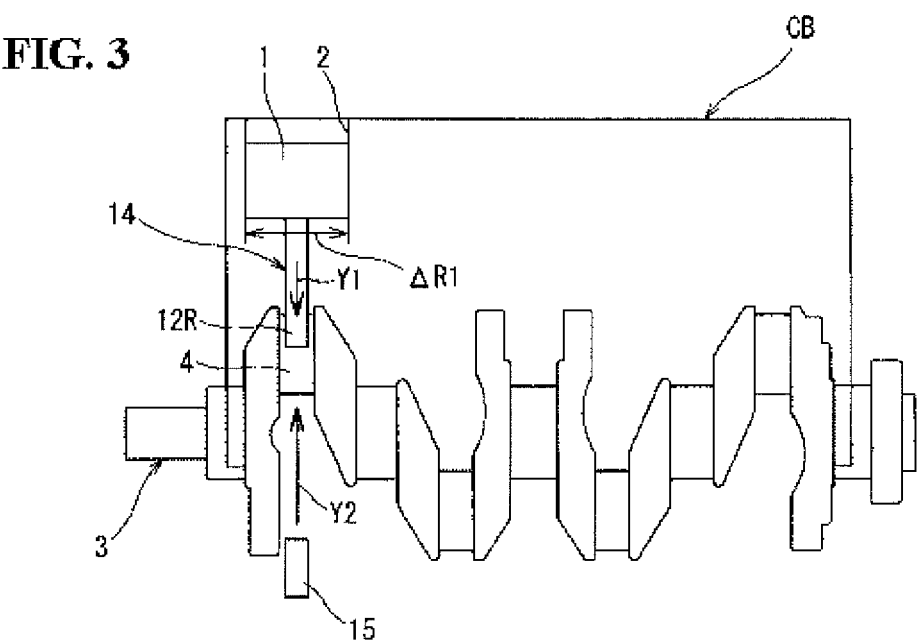
FIG. 3 is a schematic diagram showing an assembly operation of a connecting rod in accordance with one or more embodiments of the present disclosure.

Referring to FIGS. 2 and 3, a connecting rod 10 has three portions, i.e., a small end portion 11 connected through a piston pin (not shown) to a piston, a large end portion 12 rotatably connected to a crank pin 4 of a crankshaft 3, and a rod portion 13 connecting the small end portion 11 and large end portion 12. The connecting rod 10 is formed by two separate pieces at its large end portion 12. That is, large end portion 12 is formed by a half-cut shaped bearing cap 15 forming a part 12C of the large end portion 12, and a part of a main rod body 14 that forms a remainder 12R of large end portion 12. Main rod body 14 is integrally formed by remainder 12R of large end portion 12, small end portion 11, and rod portion 13. Cap 15 and main rod body 14 are in an abutting contact with each other at a mating surface (partition surface) 16 and fastened/fixed together at each side of large end portion 12 by a bolt 17, respectively. Thus, large end portion 12 is divided into a half-cut shaped, large end portion 12R comprising part of main rod body 14, and another half-cut shaped portion 12C comprising cap 15, partitioned by mating surface 16. Mating surface 16 is in a horizontal partition type and extends along a reference horizontal surface perpendicular to a link center line L1 connecting a center of small end portion 11 and that of large end portion 12.

FIG. 1 generally shows a series of manufacturing steps for a connecting rod 10 in accordance with one or more embodiments of the present disclosure. In FIG. 1, configurations of small end portion 11 are omitted.

At a time immediately after a forging operation (i.e., prior to a processing/machining operation), the large end portion 12 of main rod body 14 and cap 15 are integrally formed with upset portions 20R, 20C at both sides 18 in a width direction L2 (left to right direction of FIG. 1) which extends perpendicular to both the link center line L1 connecting the small end portion 11 and large end portion 12 and an axial direction of a crank pin. In other words, prior to machining, both opposite sides 18 in the width direction L2 have a locally wider size at their upset portion 20R, 20C in the vicinity of the mating surface 16 than the other portions. That is, this connecting rod 10 thus produced is basically for a long stroke engine, and the upset portion 20C, 20R has been added so that the width of the large end portion 12 becomes the same as that for an existing connecting rod without long stroke configuration.

First, in the pre-machining step S1, pre-processing operations are applied to rod main body 14 and cap 15, respectively. More specifically, with respect to main rod body 14, while the upset portion 20R is being held and clamped for a reference seat by a suitable clamping jig 21, large end bore 12A, for a bearing surface of crank pin, is roughly bored on large end portion 12R. In addition, hole processing of small end portion 11, drilling of oil hole 22, bolt hole 23, and the like are machined. Similarly, with respect to cap 15, while the upset portion 20C of the opposite sides in the width direction is being held and clamped at a reference seat, the large end portion 12C for a crank pin bearing surface will be roughly bored and drilling of a through bolt hole 24 and the like are performed.

Next, in a cutting or machining step S2, as shown in a broken line, while main rod body 14 and cap 15 are temporarily fastened/fixed together by two bolts 17 with the same prescribed torque as for a assembled condition, both the upset portion 20R of main rod body 14 and a part of upset portion 20C of cap 15 will be machined. More specifically, regarding the upset portion 20C, the upper portion including mating surface 16 between main rod body 14 and cap 15 will be cut away. The cutting depth in this instance is defined in such a way that the (maximum) width size ΔR3 (see FIG. 2) of large end portion 12 of main rod body 14 (see FIG. 2) is set to be at least smaller than a diameter ΔR1 (see FIG. 3) of cylinder bore 2 so that the machined large end portion 12 of main rod body 14 is able to be inserted within the cylinder bore 2. (More precisely, the thickness in the axial direction of a piston pin has to be considered for the large end portion so that width size ΔR3 should be defined sufficiently smaller than a cylinder bore diameter to ensure a bump-free insertion of main rod body against a cylinder bore). This machining operation also produces a step-less, flush surface configuration between the side surfaces of main rod body 14 and cap 15 across the mating surface 16. Moreover, with respect to the sides of large end portion 12C of cap 15, only the upper portion 27 will be cut away to have the same width ΔR3 as that of large end portion 12R of main rod body 14, which is smaller than the width ΔR2 (see FIG. 2) of cap lower part 28. In other words, cap 15 keeps a part of upset portion 20C at its lower part, and is constructed to form a step with this wider width portion at its lower part 28.

Also, in the cutting step S2, in addition to the above described cutting operations, a rough processing (rough homing processing) is performed to large end bore 12A of large end portion 12. More specifically, while temporarily holding main rod body 14 and cap 15 with two bolts 17 under the same torque conditions as the assembly operation, the cutting operation of upset portions 20C, 20R of large end portion 12 will be performed together with a rough processing on large end bore 12A. If the rough processing of large end bore 12A is to be conducted after the cutting operation, by holding and clamping the remaining upset portion 20C with width ΔR2 (>ΔR3), the same jig can be used for a conventional connecting rod with large end portion.

Subsequently, in a disassembly step S3, bolts 17 are removed, and main rod body 14 and cap 15 will be dismantled. By doing this, residual strains generated during the cutting process S2 and at the large end bore processing will be removed, and therefore, when assembled again, a deformation of large end hole 12A will be suppressed to a minimum and a reproductively of bore circularity will be improved. In the following finish processing step S4 for processing large end portion bore processing, main rod body 14 and cap 15 will be fastened and clamped together again by two bolts 17 under the same torque condition as assembled condition and the upset portion 20C remaining at cap lower part 28 will be retained/clamped by a jig 21. Under these conditions, a horning processing will be done as a finishing process on large end portion bore 12A for a bearing surface of large end portion 12. Thereafter, the semi-assembled product will under go a suitable cleaning process and is dispatched to an engine assembly factory.

In an engine assembly process step S5 in an engine assembly factory, as shown in FIG. 3, while piston 1 is being connected via piston pin to small end 11 of main rod body 14, main rod body 14 will be introduced with large end portion 12R advancing ahead in a direction of arrow Y1 into cylinder bore 2 of cylinder block CB from its upper side, and large end portion 12R of main rod body 14 will be seated on crank pin 4 of crankshaft 3 disposed below the cylinder block CB. Then, as shown in a direction of arrow Y2, cap 15 will be placed on crank pin 14 from beneath, and both parts 14 and 15 will be fastened to a prescribed torque to be finally assembled within an engine.

As described above, in one or more embodiments of the present disclosure, when manufacturing a connecting rod 10 for a long stroke engine, in the pre-machining step S1, the same width size ΔR2 of large end portion is secured as that for existing connecting rods without a long stroke configuration by maintaining upset portions 20C, 20R protruding from the large end portion 12 in the width direction both at main rod body 14 and cap 15. Therefore, the reference position against which opposite sides of large end portion 12 ramain the same as that for an existing connecting rod so that the same jigs and/or installation equipments are used for processing operations.

Also, if the upset portions 20C, 20R were to be cut away after the finish processing step S4, a change in axial force due to the cutting process may affect the reproductively of circularity during the engine assembly process S5. In one or more embodiments of the present disclosure, however, the cutting process S2 takes place prior to a finish processing S4. That is, upset portion 20R of main rod body 14 will be cut prior to finishing processing and, thereafter in the disassembly process S3, main rod body 14 and cap 15 are dismantled. Thus, one or more embodiments of the present disclosure removes the harmful influence from the cutting process and can conduct a homing process accurately under the prescribed axial force without posing a detrimental influence on reproductively of circularity of large end bore 12A in engine assembly step S5.

In the finish processing step S4, because a machining is made while main rod body 14 and cap 15 are being fastened by bolt 17, the same jig 21 as that for an existing connecting rod may be used for the finish processing. This is because of the remaining upset portions 20C provided at cap lower part 28 remains for clamping purpose despite the upset portion 20R on the part of cap main rod body 14 having been cut away. Moreover, in the final engine assembly step S5, because the upset portion 20R of main rod body 14 has been cut away, main rod body 14 can be inserted in cylinder bore 2 even when a bore diameter has been reduced for a long stroke configuration.

As described above, in the assembly step S5, the width size of large end portion 12R of main rod body 14 is reduced to enable main rod body 14 to be inserted into cylinder bore 2. In contrast, in both the pre-machining step S1 and finish processing step S4, by making use of upset portion 20C, 20R protruding in the opposite, width directions, the same jig 21 as that for an existing connecting rod may be used for a common use of manufacturing facilities and enables manufacturing in the same manufacturing line. Thus, increase in manufacturing cost due to additional manufacturing facilities can be suppressed and an improvement in productivity will be achieved.

In addition, when connecting rod 10 is finished as a final product, because the upset portion 20R of main rod body 14 and upset portion 20C of cap 15 have been cut away, a weight reduction and a compact size may be obtained. Further, by maintaining upset portion 20C at cap lower part 28 and a suitable amount of remainder 25 on the part of main rod body 14, a decrease in rigidity of large end portion 12 may be alleviated.

Furthermore, in the above described cutting step S2, the width size ΔR3 of main rod body 14 and of cap 15 are the same at the location of mating surface 16, and while main rod body 14 and cap 15 are being secured by bolt 17, both the width side of large end portion 12R of main rod body 14 and a part of width side of large end portion 12C of cap 15 will be cut away such that the side surfaces of the two components build a flush or flat surface. Therefore, when connecting rod 10 is a final product, both width sides of large end portion 12 of cap 15 are cut away only at a cap upper part 27 including the mating surface 16 with main rod body 14 to have the same width size ΔR3 as the end portion 12 of main rod body 14. Thus, both side surfaces are built free of a step with a flush or flat configuration. This configuration may reduce a fretting wear at the mating surface 16 and suppress deformation of large end bore 12A while improving a reproductively of circularity.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method to modify the geometry of a connecting rod of an internal combustion engine, the method comprising:
providing the internal combustion engine that defines a cylinder bore therein;
forming a connecting rod comprising:
a connecting rod main body; and
a bearing cap,
wherein a first end of the connecting rod is formed by a bottom end portion of the connecting rod main body and the bearing cap,
wherein the bottom end portion of the connecting rod main body and the bearing cap are configured to be mated at a mating surface to form a crankshaft bore therebetween,
wherein the bottom end portion of the connecting rod main body comprises a pair of non-upset portions whose overall width is less than a diameter of the cylinder bore,
wherein the bottom end portion of the connecting rod main body comprises a pair of first upset width extension portions whose overall width is a second width greater than the diameter of the cylinder bore,
wherein the bearing cap comprises a second upset width extension portion whose overall width is greater than the diameter of the cylinder bore;
pre-machining the bottom end portion of the connecting rod main body while clamping the first upset width extension portions;
pre-machining the bearing cap while clamping the second upset width extension portions;
temporarily fastening the connecting rod main body and the bearing cap together by bolts such that the first upset width extension portions and the second upset width extension portions are mated to each at a mating surface;
machining the first upset width extension portions and a first part of each of the second upset width extension portions while the bottom end portion and the earing cap are temporarily fastened, such that the first upset width extension portion and the part of the second upset width extension portions at the mating surface have identical overall widths that are less than the diameter of the cylinder bore, and a second part of each of the second upset width extension portions on a side opposite to the mating surface is left un-machined;
disassembling the bearing cap from the bottom end portion of the connecting rod main body;
re-assembling the bearing cap to the bottom end portion of the connecting rod main body by bolts; and
finish-processing the crankshaft bore while the bottom end portion of the connecting rod main body and the bearing cap are fastened together by clamping the second part of each of the second upset width extension portions together by bolts.

2. The method of claim 1, further comprising:
disassembling the bearing cap from the bottom end portion of the connecting rod; re-assembling the bearing cap to the bottom end portion of the connecting rod; and
finish machining the crankshaft bore of the re-assembled connecting rod.

3. The method of claim 1, further comprising rough machining the crankshaft bore of the connecting rod while the bearing cap is mated to the bottom end portion of the connecting rod.

* * * * *